United States Patent
Fournel et al.

(10) Patent No.: US 11,180,404 B2
(45) Date of Patent: Nov. 23, 2021

(54) METHOD AND APPARATUS FOR PROCESSING GLASS

(71) Applicant: CORNING INCORPORATED, Corning, NY (US)

(72) Inventors: Olivier Fournel, Yerres (FR); Allan Mark Fredholm, Vulaines sur Seine (FR)

(73) Assignee: Corning Incorporated, Corning, NY (US)

( * ) Notice: Subject to any disclaimer, the term of this patent is extended or adjusted under 35 U.S.C. 154(b) by 267 days.

(21) Appl. No.: 16/094,955

(22) PCT Filed: Apr. 18, 2017

(86) PCT No.: PCT/US2017/028035
§ 371 (c)(1),
(2) Date: Oct. 19, 2018

(87) PCT Pub. No.: WO2017/184544
PCT Pub. Date: Oct. 26, 2017

(65) Prior Publication Data
US 2019/0152825 A1 May 23, 2019

Related U.S. Application Data

(60) Provisional application No. 62/325,672, filed on Apr. 21, 2016.

(51) Int. Cl.
*C03B 17/06* (2006.01)
*C03B 13/04* (2006.01)

(52) U.S. Cl.
CPC .............. *C03B 17/06* (2013.01); *C03B 13/04* (2013.01); *C03B 17/064* (2013.01)

(58) Field of Classification Search
CPC .......... C03B 13/00; C03B 13/04; C03B 17/06
See application file for complete search history.

(56) References Cited

U.S. PATENT DOCUMENTS

| | | | | |
|---|---|---|---|---|
| 1,761,342 | A | * 6/1930 | Hitner | C03B 17/061 65/253 |
| RE18,071 | E | * 5/1931 | Hitner | C03B 17/06 65/253 |
| 3,149,949 | A | 9/1964 | Dockerty et al. | |
| 3,847,585 | A | 11/1974 | Chisholm | |
| RE31,442 | E | * 11/1983 | Pfaender | C03B 17/068 373/27 |

(Continued)

FOREIGN PATENT DOCUMENTS

| CN | 1657453 A | 8/2005 |
|---|---|---|
| CN | 1715225 A | 1/2006 |

(Continued)

OTHER PUBLICATIONS

English language machine translation of CN202808576U.*

(Continued)

*Primary Examiner* — Jason L Lazorcik
(74) *Attorney, Agent, or Firm* — Ryan T. Hardee

(57) ABSTRACT

A slot orifice design that delivers glass ribbon at a uniform temperature and flow across the slot orifice width is provided. The slot orifice design can include a transition section, a pressure tank, and a slot extension.

17 Claims, 18 Drawing Sheets

(56) References Cited

U.S. PATENT DOCUMENTS

| | | | | |
|---|---|---|---|---|
| 2009/0019892 | A1* | 1/2009 | Fredholm | C03B 17/06 65/91 |
| 2012/0304695 | A1* | 12/2012 | Lakota | C03B 13/04 65/29.19 |
| 2013/0133369 | A1 | 5/2013 | Lock | |
| 2015/0027169 | A1* | 1/2015 | Fredholm | C03B 13/04 65/101 |
| 2015/0099618 | A1* | 4/2015 | Bisson | C03C 10/00 501/32 |
| 2015/0191387 | A1* | 7/2015 | Bisson | C03B 18/02 65/99.2 |
| 2016/0229729 | A1 | 8/2016 | Peterson et al. | |
| 2019/0169059 | A1* | 6/2019 | Fredholm | C03B 7/08 |

FOREIGN PATENT DOCUMENTS

| | | |
|---|---|---|
| CN | 202808573 U | 3/2013 |
| CN | 202808576 U | 3/2013 |
| CN | 103608305 A | 2/2014 |
| CN | 104220386 A | 12/2014 |
| DE | 3329843 A1 | 1/1984 |
| DE | 3507852 A1 | 8/1985 |
| JP | 2007284347 A | 11/2007 |
| JP | 4120910 B2 | 7/2008 |
| JP | 2014-094861 A | 5/2014 |
| TW | 451362 U | 4/2013 |
| TW | 452173 U | 5/2013 |
| TW | 201518080 A | 5/2015 |
| WO | 2015048726 A1 | 4/2015 |
| WO | 2017/184544 A1 | 10/2017 |

OTHER PUBLICATIONS

English language machine translation of DE102004007560.*
Taiwanese Patent Application No. 106112517, Office Action dated Nov. 16, 2020, 6 pages (English Translation Only); Taiwanese Patent Office.
International Search Report and Written Opinion of the International Searching Authority; PCT/US2017/028035; dated Jul. 3, 2017; 13 Pages; European Patent Office.
Chinese Patent Application No. 201780025017.4, Office Action dated Jan. 6, 2021; 12 pages (5 pages of English Translation and 7 pages of Original Document); Chinese Patent Office.
Korean Patent Application No. 2018-7033243, Office Action dated Mar. 15, 2021, 9 pages (4 page of English Translation and 5 pages of Original Document); Korean Patent Office.

* cited by examiner

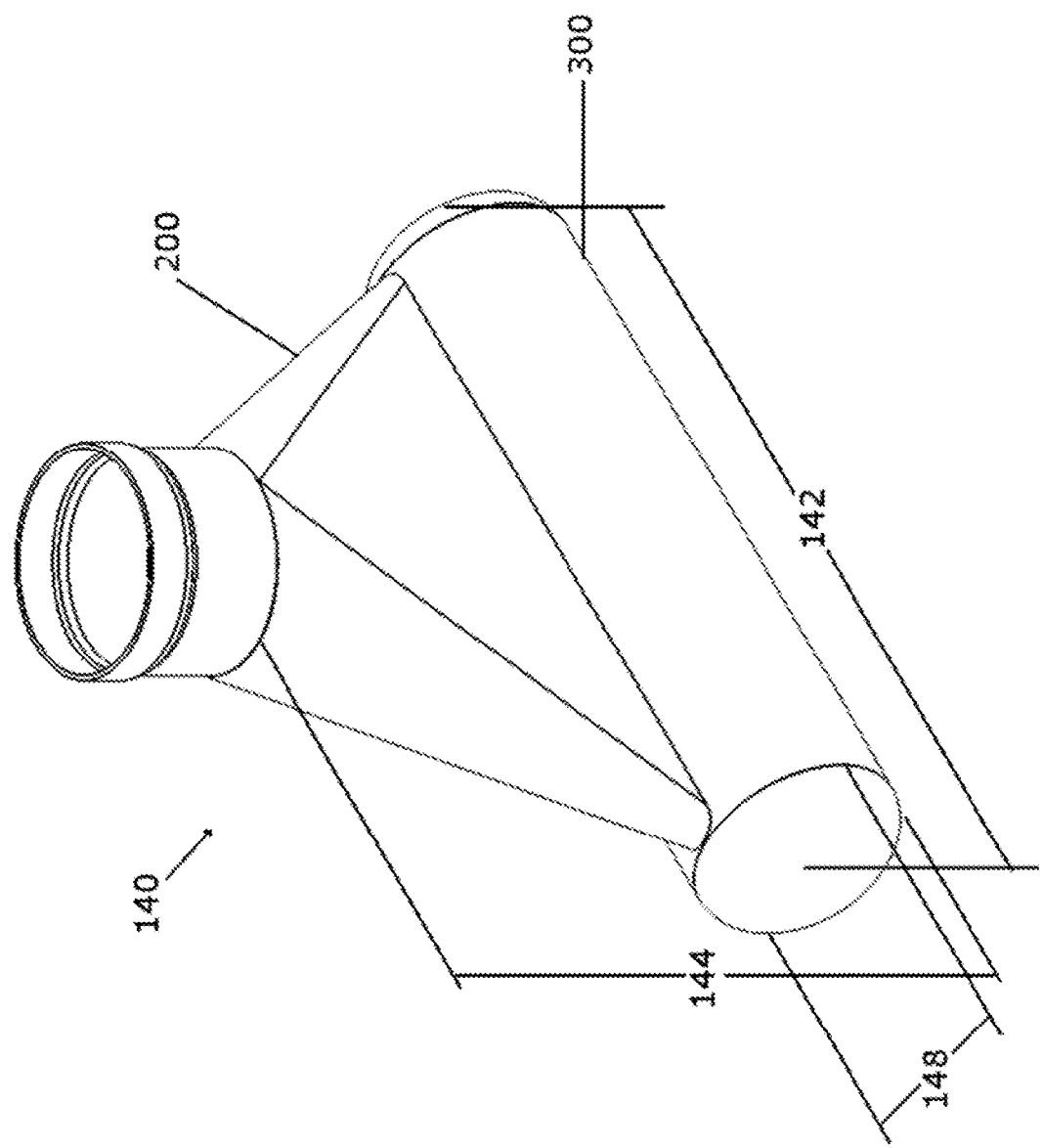
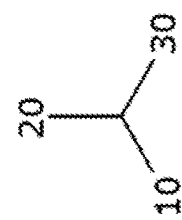
FIG. 2

METHOD AND APPARATUS FOR PROCESSING GLASS

CROSS-REFERENCE TO RELATED APPLICATIONS

This application claims the benefit of priority under 35 U.S.C. § 371 of International Patent Application Serial No. PCT/US2017/028035, filed on Apr. 18, 2017, which in turn, claims the benefit of priority of U.S. Provisional Patent Application Serial No. 62/325,672 filed on Apr. 21, 2016, the contents of each of which are relied upon and incorporated herein by reference in their entireties.

BACKGROUND

Field

Embodiments of the present disclosure relate to forming a ribbon of glass from a molten supply.

Background

Sheet glass is formed from a ribbon of glass and is sought after for use in user interfaces, controls, displays, architectural devices, appliances, and electronic devices. These types of uses can benefit from a glass sheet than can resist impact and breakage.

SUMMARY

In one embodiment, a glass forming apparatus comprises an upper transition member comprising a transition chamber, and a pressure tank attached to the upper transition member, the pressure tank comprising an upper orifice and a lower orifice, such that a chamber within the pressure tank is in fluid communication with the transition chamber.

The glass forming apparatus can further include an upper pressure tank support positioned across the upper orifice, a lower pressure tank support positioned across the lower orifice, and a slot extension attached to the pressure tank such that an interior area of the slot extension is in fluid communication with the pressure tank. The glass forming apparatus can also include a second upper pressure tank support positioned across the upper orifice. The glass ribbon forming apparatus can further include a second lower pressure tank support positioned across the lower orifice.

The upper orifice can include a first upper aperture and a second upper aperture and an upper pressure tank support integrally formed in a wall of the pressure tank. The upper pressure tank support can be positioned between the first upper aperture and the second upper aperture. Additionally, the lower orifice can include a first lower aperture and a second lower aperture and a lower pressure tank support integrally formed in a wall of the pressure tank. The lower pressure tank support can be positioned between the first lower aperture and the second lower aperture.

In some embodiments, the apparatus can include a heat source. For example, the heat source can be the slot extension wherein a first end of the slot extension is configured to receive a first electrical connection and a second end of the slot extension is configured to receive a second electrical connection.

The glass forming apparatus can include an upper transition member support positioned across the transition chamber. For example, the upper transition member support can be fixed to the upper transition member by a metallurgic bond.

The slot extension can have a height in a range from about 18 millimeters (mm) to about 22 mm.

The pressure tank can include an end dimension extending along an end plane, the end plane being parallel to a first end of the pressure tank; a width extending between the first end and a second end of the pressure tank; and an opening dimension along an opening direction, the opening direction being parallel to the end plane and perpendicular to the width. An interior opening dimension of the pressure tank can be greater than an opening distance of the lower orifice. In some embodiments, the interior opening dimension distance can be in a range from about two to about ten times greater than the opening distance of the lower orifice.

In some embodiments, the pressure tank can have a cylindrical shape, where a longitudinal axis of the pressure tank extends along a width of a lower end of the upper transition member, the lower orifice has a width and an opening distance, and a diameter of the pressure tank is greater than the opening distance of the lower orifice.

The upper transition member can have an upper end having a width such that a width of the lower end is greater than a width of the upper end. In some embodiments, an opening distance of the upper end can be greater than an opening distance of the lower end.

In some embodiments, the lower orifice can have a width from about 50 mm to about 1.5 meters (m). In some embodiments, the lower orifice can have a width from about 150 mm to about 300 mm.

In accordance with the present disclosure, a process for forming a glass ribbon is disclosed comprising supplying a stream of molten glass to a pressure tank through an upper orifice of the pressure tank, the pressure tank redistributing the molten glass from a center of the pressure tank to a first end of the pressure tank and a second end of the pressure tank opposite the first end, and passing the stream of molten glass through a lower orifice of the pressure tank. The glass forming process can further include separating the molten glass into a plurality of molten glass flows with a lower pressure tank support, and passing the plurality of flows into a slot extension. Additionally, the method may further comprise fusing the plurality of flows of molten glass into a single flow of molten glass within the slot extension, and drawing a glass ribbon from the slot extension. The process can further include heating the stream of molten glass within the slot extension. In some embodiments, the glass ribbon can be further directed between two rolls used in a glass roller process.

The pressure tank can include an upper pressure tank support positioned across the upper orifice, and a lower pressure tank support can be positioned across the lower orifice. In some embodiments, the lower orifice can include a first lower aperture and a second lower aperture. The lower pressure tank support can be positioned between the first lower aperture and the second lower aperture. The lower pressure tank support can be integrally formed in a wall of the pressure tank.

In some embodiments, a height of the slot extension can be in a range from about 18 mm to about 22 mm. In some embodiments, the pressure tank can include a width extending between a first end and a second end of the pressure tank, the width extending along a direction parallel to a flow plane of the molten glass; and an opening dimension along an opening direction, the opening direction being perpendicular to the flow plane of the molten glass. An interior opening dimension of the pressure tank can be greater than an opening distance of the lower orifice. In some embodiments, the interior opening dimension distance of the pressure tank can be a range from about two to about ten times greater than the opening dimension distance of the lower orifice. In some embodiments, the pressure tank can comprise a cylindrical shape. The lower orifice can have a width and an opening distance and a longitudinal axis of the cylinder can extend along the width of the pressure tank. A diameter of the pressure tank cylinder can be greater than the opening distance of the lower orifice, A flow density of the molten glass through the lower orifice can be from approximately one kilogram per centimeter per hour to approximately 36 kilograms per centimeter per hour. A viscosity of the molten glass can be from approximately 50 poises to approximately 20,000 poises.

In some embodiments, the glass forming process can include feeding the stream of molten glass through a transition chamber of an upper transition member prior to feeding the stream of molten glass into the pressure tank. The upper transition member can include an upper end fixed to a molten glass supply and a lower end fixed to the pressure tank. The upper transition member can include an upper transition member support positioned across the transition chamber.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

FIG. 2 is a perspective view of an exemplary glass forming apparatus according to the present disclosure;

Features and advantages of the embodiments will become more apparent from the detailed description set forth below when taken in conjunction with the drawings, in which like reference characters identify corresponding elements throughout.

DETAILED DESCRIPTION

Embodiments of the present disclosure will now be described in detail with reference to the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Glass sheets are commonly fabricated by flowing molten glass to a forming body whereby a glass ribbon may be formed by a variety of ribbon forming processes including, float, slot draw, down-draw, fusion down-draw, updraw, or any other forming processes. The glass ribbon from any of these processes may then be subsequently divided to provide one or more glass sheets suitable for further processing into a desired application, including but not limited to, a display application. For example, the one or more glass sheets can be used in a variety of display applications, including liquid crystal displays (LCDs), electrophoretic displays (EPD), organic light emitting diode displays (OLEDs), plasma display panels (PDPs), or the like. Glass sheets may be transported from one location to another. The glass sheets may be transported with a conventional support frame designed to secure a stack of glass sheets in place. Moreover, interleaf material can be placed between each adjacent glass sheet to help prevent contact between, and therefore preserve, the pristine surfaces of the glass sheets.

It is to be understood that specific embodiments disclosed herein are intended to be exemplary and therefore non-limiting. As such, the present disclosure relates to methods and apparatus for processing at least one of a glass ribbon and a glass sheet. In some embodiments, the glass ribbon to be processed can be formed from a glass manufacturing apparatus, can be provided as it is being formed from a glass manufacturing apparatus, can be provided from a spool of previously-formed glass ribbon that can be uncoiled from the spool, or can be provided as a freestanding glass ribbon. In some embodiments, the glass sheet to be processed can be formed by a glass manufacturing apparatus, can be provided as a glass sheet separated from a glass ribbon, can be provided as a glass sheet separated from another glass sheet, can be provided as a glass sheet uncoiled from a spool of glass sheets, can be provided as a glass sheet obtained from a stack of glass sheets, or can be provided as a freestanding glass sheet.

Figure 1:
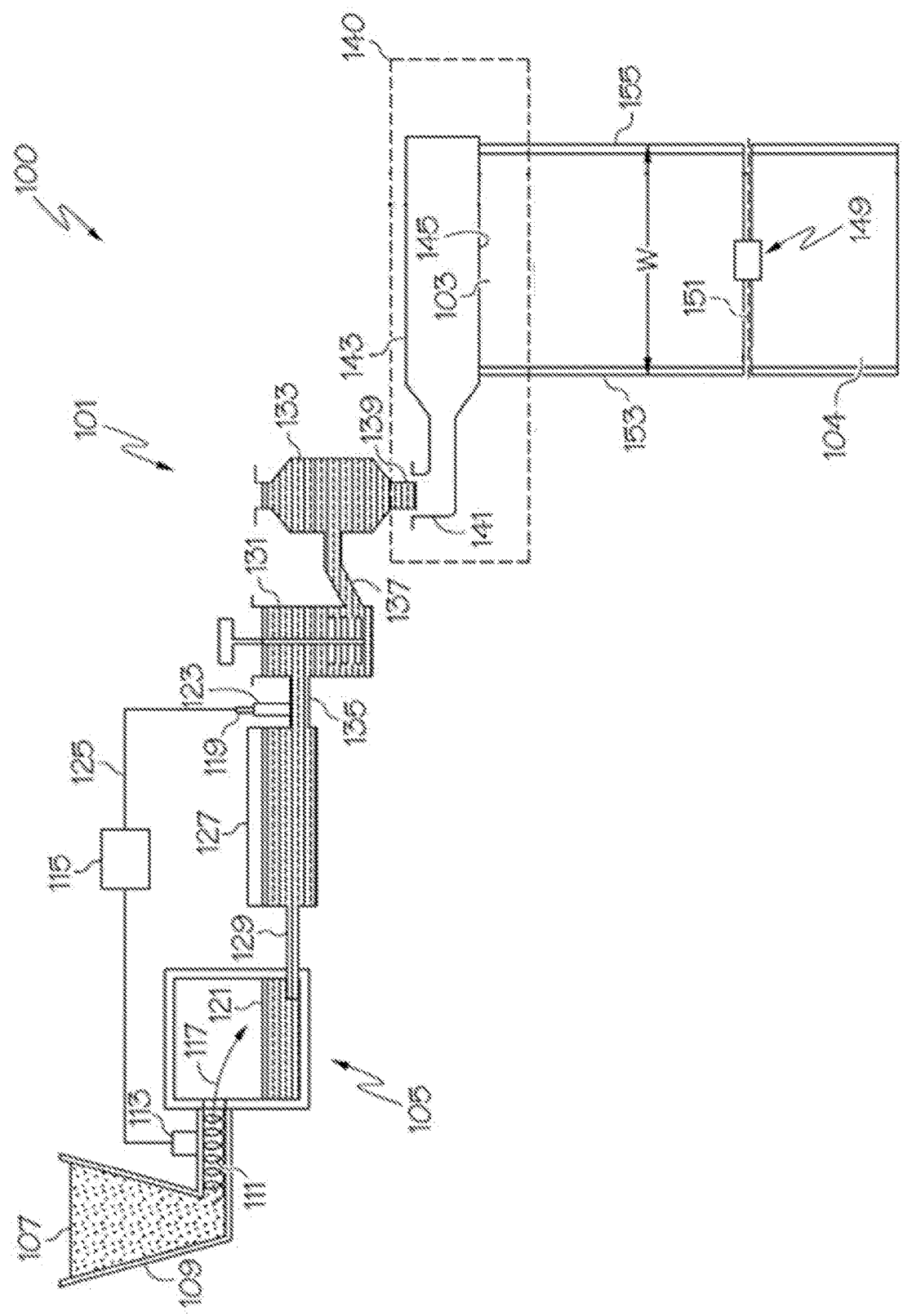
FIG. 1 is a schematic view of a glass processing apparatus including a fusion down-draw apparatus to draw a glass ribbon.

In one embodiment, the glass processing apparatus 100 provides the glass ribbon 103 with a glass manufacturing apparatus 101 such as a slot draw apparatus, float bath apparatus, down-draw apparatus, up-draw apparatus, press-rolling apparatus, or other glass ribbon manufacturing apparatus (as described in further detail below). FIG. 1 schematically illustrates the glass manufacturing apparatus 101 being a fusion down-draw apparatus 101 for fusion drawing the glass ribbon 103 for subsequent processing into glass sheets 104 through the use of a glass former 140. Of course and as explained below, the glass manufacturing apparatus 101 can be a slot draw apparatus or other glass ribbon manufacturing apparatus and include differing glass formers depending upon the method of manufacture (see, e.g., FIGS. 2-5).

The fusion down-draw apparatus 101 can include a melting vessel 105 oriented to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by arrow 117. A glass melt probe 119 can be used to measure a level of molten material 121 within a standpipe 123 and communicate the measured information to the controller 115 by way of a communication line 125.

The fusion down-draw apparatus 101 can also include a fining vessel 127 located downstream from the melting vessel 105 and coupled to the melting vessel 105 by way of a first connecting conduit 129. In some embodiments, molten material 121 may be gravity fed from the melting vessel 105 to the fining vessel 127 by way of the first connecting conduit 129. For instance, gravity may act to drive the molten material 121 to pass through an interior pathway of the first connecting conduit 129 from the melting vessel 105 to the fining vessel 127. Within the fining vessel 127, bubbles may be removed from the molten material 121 by various techniques.

The fusion down-draw apparatus 101 can further include a mixing chamber 131 that may be located downstream from the fining vessel 127. The mixing chamber 131 can be used to provide a homogenous composition of molten material 121, thereby reducing or eliminating cords of inhomogeneity that may otherwise exist within the molten material 121 exiting the fining vessel 127. As shown, the fining vessel 127 may be coupled to the mixing chamber 131 by way of a second connecting conduit 135. In some embodiments, molten material 121 may be gravity fed from the fining vessel 127 to the mixing chamber 131 by way of the second connecting conduit 135. For instance, gravity may act to drive the molten material 121 to pass through an interior pathway of the second connecting conduit 135 from the fining vessel 127 to the mixing chamber 131.

The fusion down-draw apparatus 101 can further include a delivery vessel 133 that may be located downstream from the mixing chamber 131. The delivery vessel 133 may condition the molten material 121 to be fed into a glass former 140. For instance, the delivery vessel 133 can act as an accumulator and/or flow controller to adjust and provide a consistent flow of molten material 121 to the glass former 140. As shown, the mixing chamber 131 may be coupled to the delivery vessel 133 by way of a third connecting conduit 137. In some embodiments, molten material 121 may be gravity fed from the mixing chamber 131 to the delivery vessel 133 by way of the third connecting conduit 137. For instance, gravity may act to drive the molten material 121 to pass through an interior pathway of the third connecting conduit 137 from the mixing chamber 131 to the delivery vessel 133.

As further illustrated, a delivery pipe 139 can be positioned to deliver molten material 121 to the glass former 140 of the fusion down-draw apparatus 101. As discussed more fully below, the glass former 140 may draw the molten material 121 into the glass ribbon 103 off of a root 145 of a forming vessel 143. In the illustrated embodiment, the forming vessel 143 can be provided with an inlet 141 oriented to receive molten material 121 from the delivery pipe 139 of the delivery vessel 133.

FIG. 1 illustrates a general schematic of an exemplary glass separator 149. As illustrated, an exemplary glass separator 149 may separate the glass sheet 104 from the glass ribbon 103 along a transverse separation path 151 that extends along the width "W" of the glass ribbon 103, transverse to the draw direction 177 of the glass former 140, between a first vertical edge 153 of the glass ribbon 103 and a second vertical edge 155 of the glass ribbon 103.

Glass former 140 can be scalable to deliver glass ribbon 103 of a desired size. In some embodiments, glass ribbon 103 can have a width "W" from about 50 mm to about 1.5 m. In a further embodiments, glass ribbon 103 can have a width W from about 50 mm to about 500 mm. Glass ribbon 103 can have a width W from about 150 mm to about 300 mm. In some embodiments, the width "W" of the glass ribbon 103 can be from about 20 mm to about 4000 mm, such as from about 50 mm to about 4000 mm, such as from about 100 mm to about 4000 mm, such as from about 500 mm to about 4000 mm, such as from about 1000 mm to about 4000 mm, such as from about 2000 mm to about 4000 mm, such as from about 3000 mm to about 4000 mm, such as from about 20 mm to about 3000 mm, such as from about 50 mm to about 3000 mm, such as from about 100 mm to about 3000 mm, such as from about 500 mm to about 3000 mm, such as from about 1000 mm to about 3000 mm, such as from about 2000 mm to about 3000 mm, such as from about 2000 mm to about 2500 mm, and all ranges and subranges therebetween.

Figure 3:
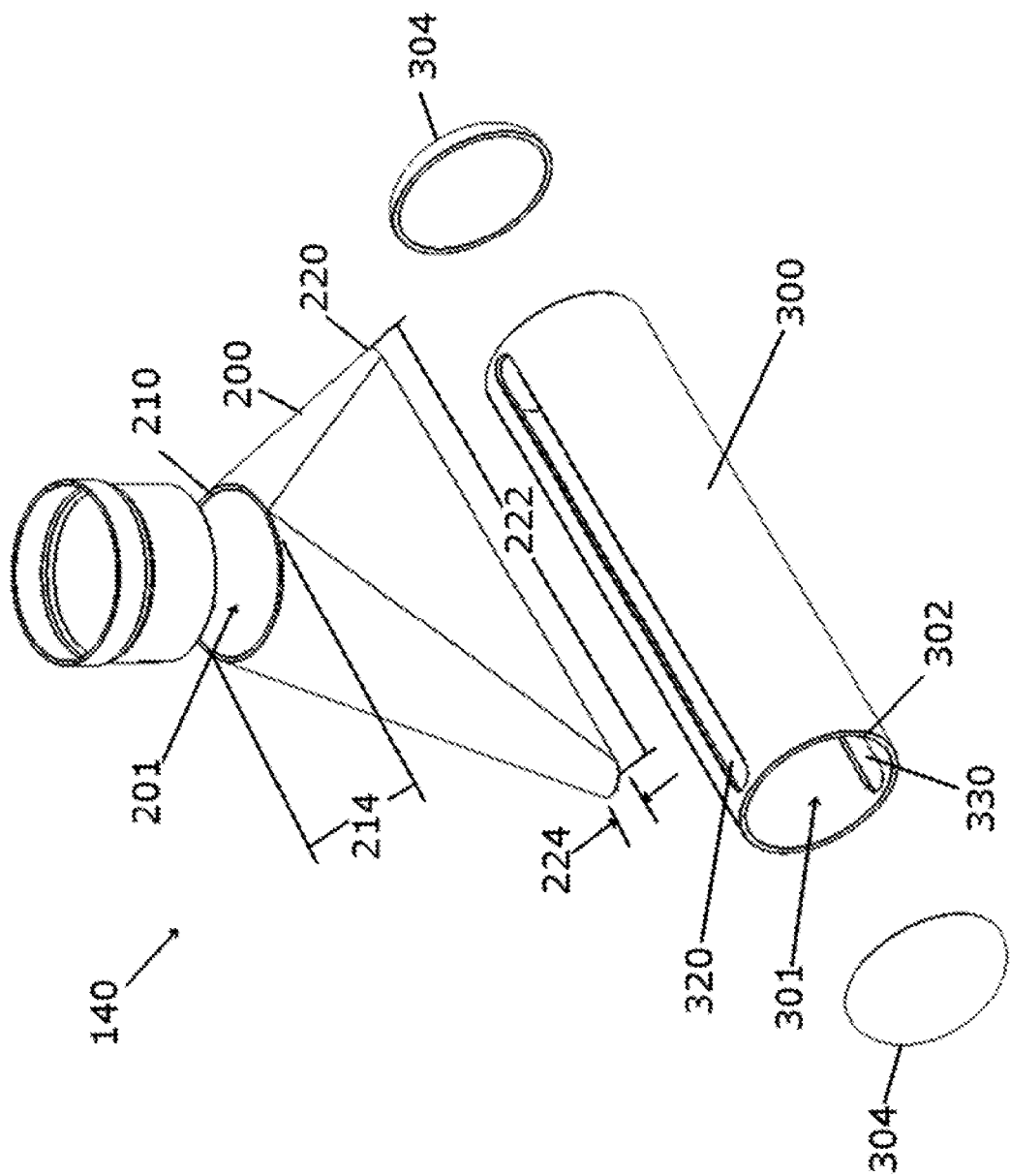
FIG. 3 is an exploded perspective view of the glass forming apparatus of FIG. 1.

Another embodiment of glass former 140 is shown in FIGS. 2-5. This glass former 140 can interface with the delivery pipe 139 and can deliver a glass ribbon to one or more downstream forming rolls 60 (see FIG. 14). As shown in FIG. 2, glass former 140 can have a width 142 extending along axis 10, a height 144 extending along axis 20, and a dimension 148 extending in the opening direction along axis 30 (FIG. 2). "Width" and "thickness" are also used herein to describe distance in the direction of axes 10 and 30, respectively, usually with respect to dimensions of the glass ribbon 103. Glass former 140 can include an upper transition member 200 and a pressure tank 300 to draw glass ribbon 103. Glass former 140 can draw glass flow ribbon 103 in a relatively short transition—height 144—from the molten glass supply because pressure tank 300 allows the molten glass to collect within pressure tank chamber 301 and directs the molten glass across lower orifice 330 (FIGS. 3).

Figure 6:
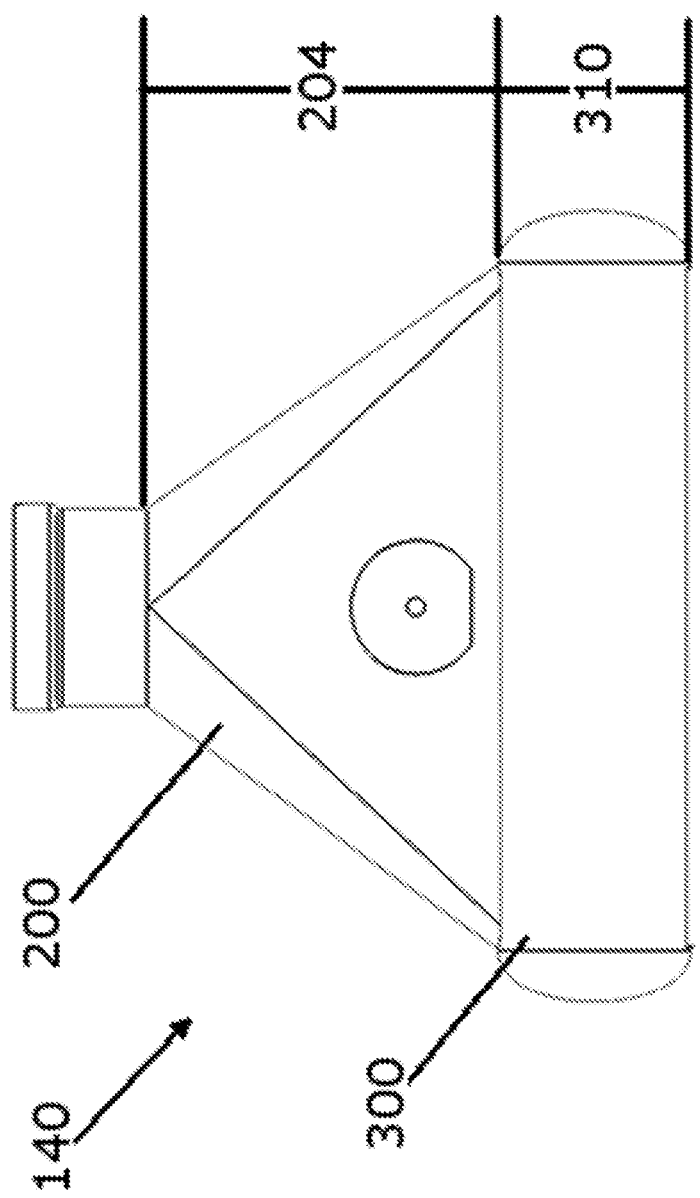
FIG. 6 is a side view of the glass forming apparatus of FIG. 1.

As shown in FIGS. 2-3, upper transition member 200 can be fixed to a molten glass supply at upper end 210 of upper transition member 200. For example, upper end 210 can be metallurgically bonded to the molten glass supply by welding or brazing. The molten glass can flow through transition chamber 201 of upper transition member 200. Upper transition member 200 can distribute molten glass from the center of upper end 210 across lower end width 222 at lower end 220. Upper transition member can have a height 204 as shown in FIG. 6. Upper transition member 200 can be tapered along height 204 such that lower end width 222 is greater than upper end width 212. As shown in FIG. 3, upper end opening distance 214 can be greater than lower end opening distance 224. In some embodiments, upper transition member 200 can have a trapezoidal shape when viewed from the front, back, or side.

As used herein, the term "orifice" refers to an opening in a portion of glass former 140 that is configured to transmit fluid flow. An orifice can include one aperture (e.g., FIG. 3) or a plurality of apertures separated by supports (e.g., FIG. 8).

Pressure tank 300 can be attached to lower end 220 of upper transition member 200. For example, pressure tank 300 can be fixed to upper transition member 200 by a metallurgic bond by welding or brazing. Pressure tank 300 can include an upper orifice 320 and a lower orifice 330 formed therein such that pressure tank width 306 (see FIG. 3) can be greater than upper orifice width 322 and lower orifice width 332 (see FIG. 4). The molten glass can enter pressure tank 300 from upper transition member 200 through upper orifice 320. The molten glass can flow through pressure tank chamber 301. Molten glass entering pressure tank 300 at upper orifice 320 can have an flow where the velocity of the flow is greatest at a center of the flow. Pressure tank 300 can redistribute the molten glass flow from a center of pressure tank 300 to the ends 304 of pressure tank 300 at lower orifice 330 because pressure tank 300 collects the molten glass within pressure tank chamber 301 and allows the molten glass to spread across pressure tank width 306 (FIG. 5) due in part to the flow restriction at lower orifice 330. Pressure tank ends 304 seal pressure tank 300. Pressure tank ends 304 can be outwardly curved to reduce material stress and fatigue.

Figure 18:
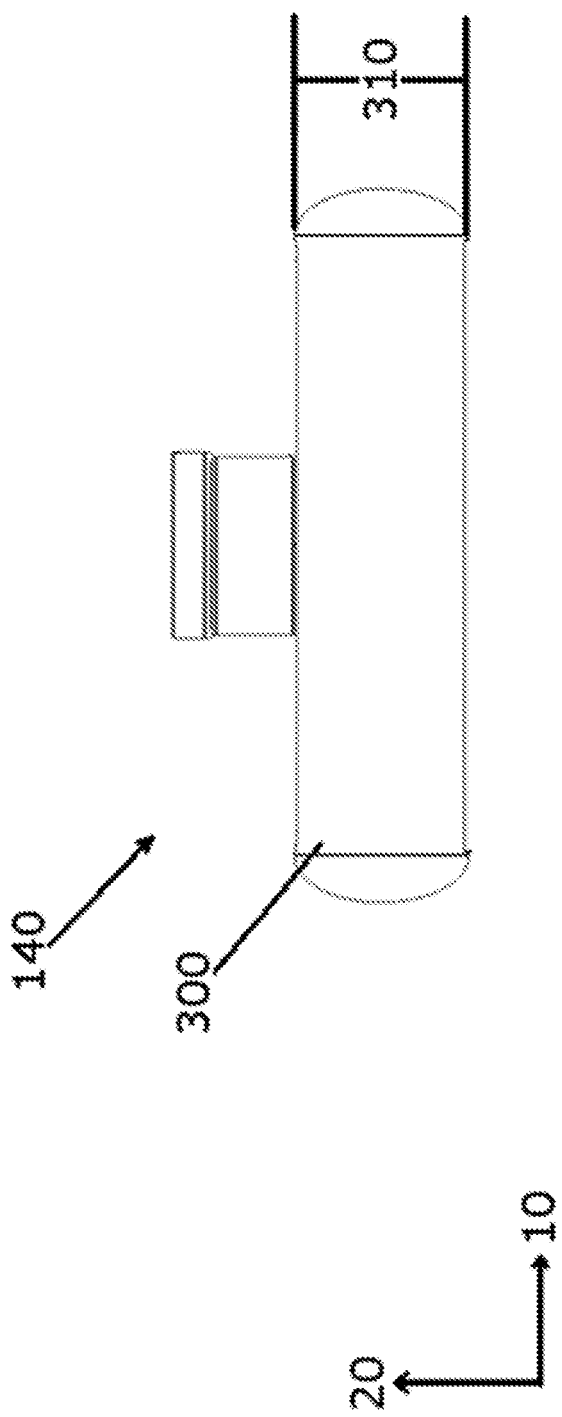
FIG. 18 is a side view of another glass forming apparatus according to the present disclosure.

In some embodiments, upper transition member 200 can be omitted from glass sheet former 140 and pressure tank 300 can be attached directly to a molten glass supply, as shown in FIG. 18.

Figure 4:
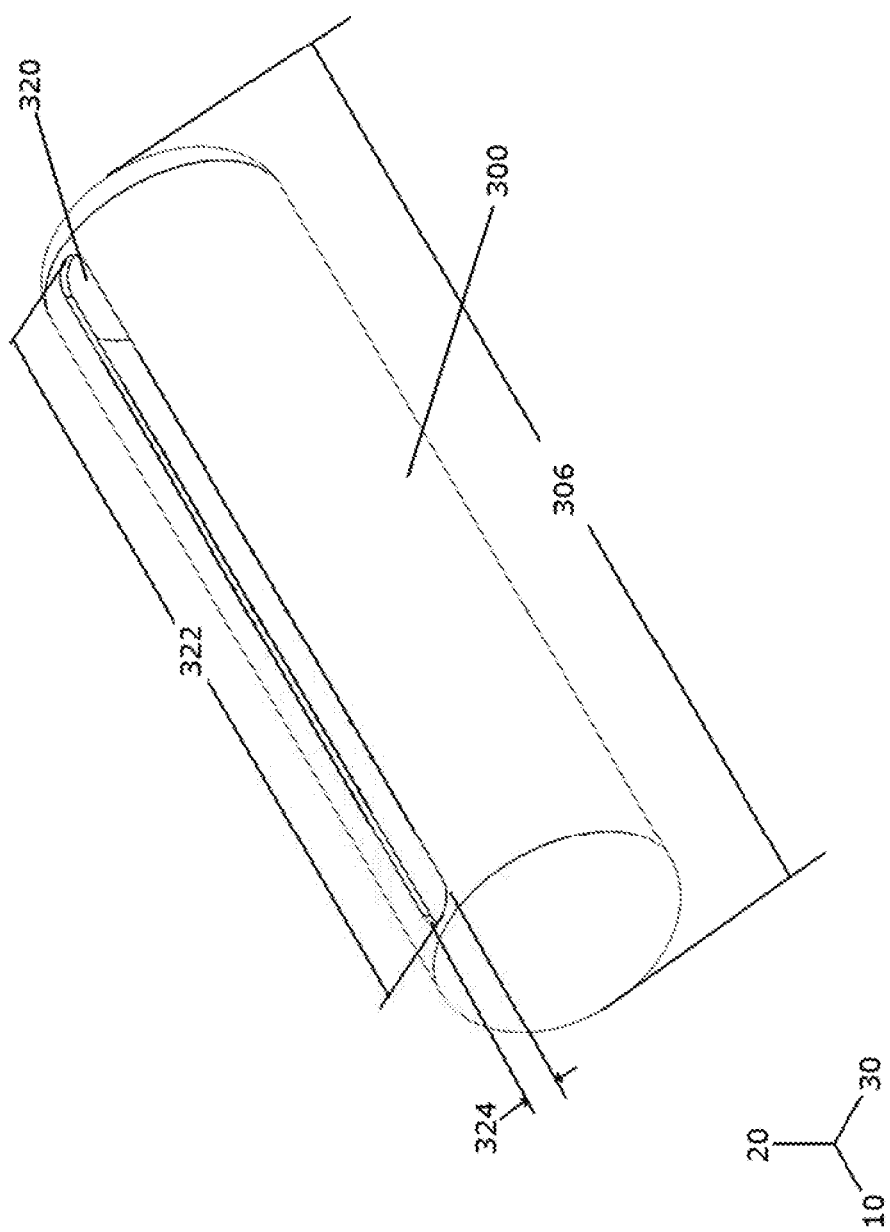
FIG. 4 is a perspective view of a pressure tank according to the present disclosure.
Figure 5:
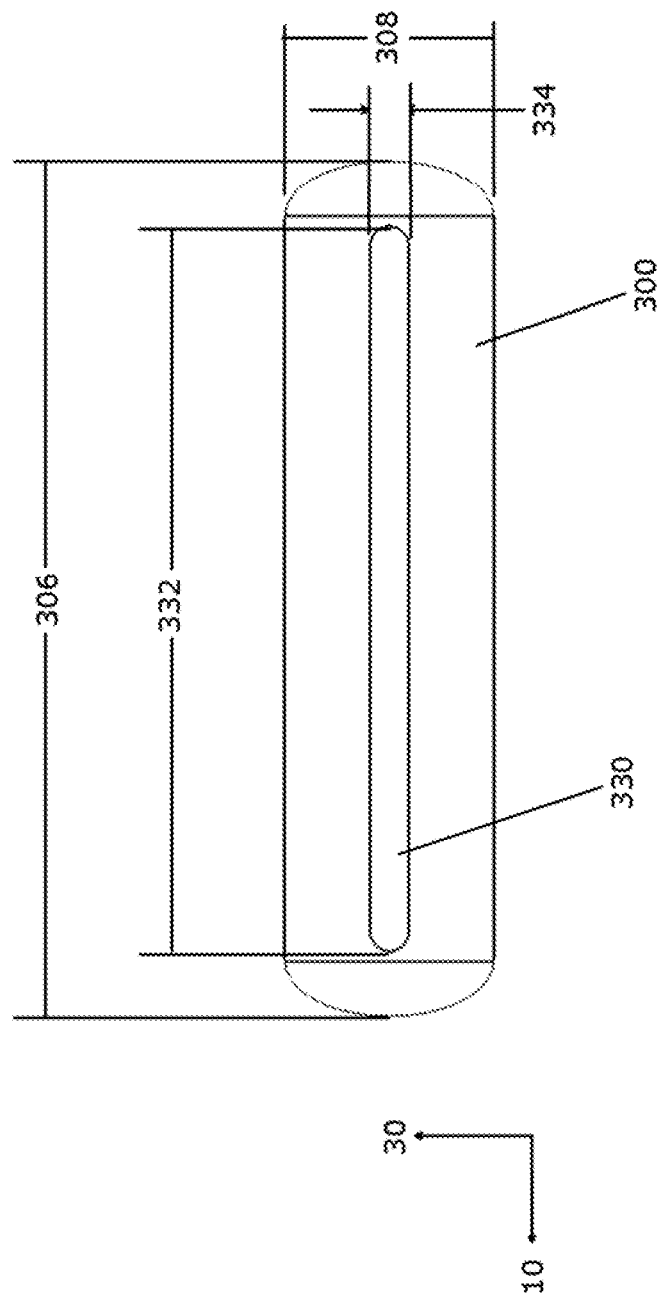
FIG. 5 is a bottom view of the pressure tank of FIG. 4.

As shown in FIGS. 3-4, pressure tank 300 can have a width 306, an opening dimension 308, and a height 310. These dimensions refer to the size of the interior of pressure tank 300 and do not include the distance occupied by the walls of pressure tank 300. Opening dimension 308 can be the largest dimension of pressure tank 300 in the opening direction along axis 30. Pressure tank can be any shape that collects the molten glass flow within its interior area to distribute the flow across lower orifice width 332 of lower orifice 330. For example, the shape of pressure tank 300 can be a rectangular prism, a cube, a triangular prism, a cone, a sphere, pyramid, or other shapes. In some embodiments, pressure tank 300 can be a cylinder where the opening dimension 308 and height 310 are equal. The width of pressure tank 300 can extend along axis 10 that lies in the plane of glass ribbon 103 such that pressure tank 300 is positioned perpendicularly to the direction of glass flow. In another embodiment, pressure tank 300 can have a tapered shape such that a surface area of a lower end of the tank 300 is greater than a surface area of an upper end of the tank 300. Cylindrical shapes are preferred as they are more resistant to deformation due to internal pressure.

As shown in FIG. 4, upper orifice 320 can have an upper orifice width 322 and an upper orifice opening distance 324. Lower orifice 330 can have a lower orifice width 332 and a lower orifice opening distance 334. In some embodiments, upper orifice 320 and lower orifice 330 can be approximately the same size. In some embodiments, lower orifice width 332 can be greater than upper orifice width 322. In some embodiments, lower orifice width 332 can be from approximately 50 mm to approximately 1.5 m. In a further embodiment, lower orifice width 332 can be from approximately 50 mm to approximately 500 mm. In another embodiment, lower orifice width 332 can be from approximately 150 mm to approximately 300 mm. In some embodiments, the flow density of molten glass through lower orifice 330 can be from one kilogram per centimeter per hour to approximately 36 kilograms per centimeter per hour.

Because the opening dimension 308 is greater than the opening distance 334 of the lower orifice 330 (FIG. 5), molten glass is subject to pressure in pressure tank 300 that distributes the molten glass along width 306 of pressure tank 300.

In some embodiments, pressure tank opening dimension 308 can be greater than upper orifice opening distance 324. In another embodiment, pressure tank opening dimension 308 can be greater than lower orifice opening distance 334. In a further embodiment, pressure tank opening dimension 308 can be greater than upper orifice opening distance 324 and lower orifice opening distance 334.

In some embodiments, pressure tank opening dimension 308 can be approximately two to approximately ten times greater than upper orifice opening distance 324. Pressure tank opening dimension 308 can be approximately four to approximately six times greater than upper orifice opening distance 324. In some embodiments, pressure tank opening dimension 308 can be approximately two to approximately ten times greater than lower orifice opening distance 334. Pressure tank opening dimension 308 can be approximately four to approximately six times greater than lower orifice opening distance 334.

In some embodiments, pressure tank opening dimension 308 can be greater than lower end opening distance 224 of upper transition member 200. In another embodiment, pressure tank opening dimension 308 can be approximately two to approximately ten times greater than lower end opening distance 224 of upper transition member 200. In a further embodiment, pressure tank opening dimension 308 can be approximately four to approximately six times greater than lower end opening distance 224 of upper transition member 200.

Glass former 140 can be a material that is resistant to material deformation, i.e., creep, at high temperatures and pressures. Glass former 140 can be a material to deliver a molten glass at a temperature of approximately 1400 degrees Celsius to approximately 1700 degrees Celsius. In some embodiments, glass former 140 can be a platinum and rhodium alloy to allow glass former 140 to be compatible with high temperature and pressure for delivering high temperature molten glass. In some embodiments, glass former 140 can be a doped PtRh alloy. In some embodiments, glass former 140 can be an 80/20 PtRh alloy. In another embodiment, glass former 140 can be a 90/10 PtRh alloy. In further embodiments, glass former 140 can be dispersion hardened platinum (DPH). In a further embodiment, glass former 140 can be a zircon doped material.

In some embodiments, the viscosity of molten glass flowing through glass former 140 can be controlled by adjusting one or more of the following: flow distance and pressure of the molten glass supply; temperature of the molten glass supply; width of lower orifice 330; and opening distance 334 of lower orifice 330. The viscosity of the molten glass flowing through glass former 140 can be from approximately 50 poises to approximately 20,000 poises. In further embodiments, the viscosity of the molten glass flowing through glass former 140 can be from approximately 1,000 poises to approximately 5,000 poises. Viscosity of the molten glass at a position in glass former 140 can be determined based on the temperature of glass former 140 at that position. In some embodiments, glass former 140 can include temperature sensors (not shown) to determine the temperature at one or more positions in glass former 140 in order to determine the viscosity of the molten glass at those positions.

Referring now to FIGS. 7-10, glass former 140 can include internal structural reinforcements to maintain its shape over time and avoid material creep at high temperature and glass pressure without external reinforcements. Due to the internal structural reinforcements, glass former 140 does not require external mechanical reinforcement to maintain its shape over time and avoid material creep at high temperature and glass pressure. For example, upper transition member 200 can include upper transition member support 230. Upper transition member support 230 can extend along axis 30 and can extend across transition chamber 201. In some embodiments, upper transition member support 230 can attach to upper transition member 200 using support plates 232 positioned at the ends of upper transition member support 230. Support plates 232 can reduce stress concentrations in portions of the wall of upper transition member 200 adjacent upper transition member support 230. In some embodiments, upper transition member support 230 and support plates 232 can be metallurgically bonded to upper transition member 200, for example by brazing or welding.

Figure 8:
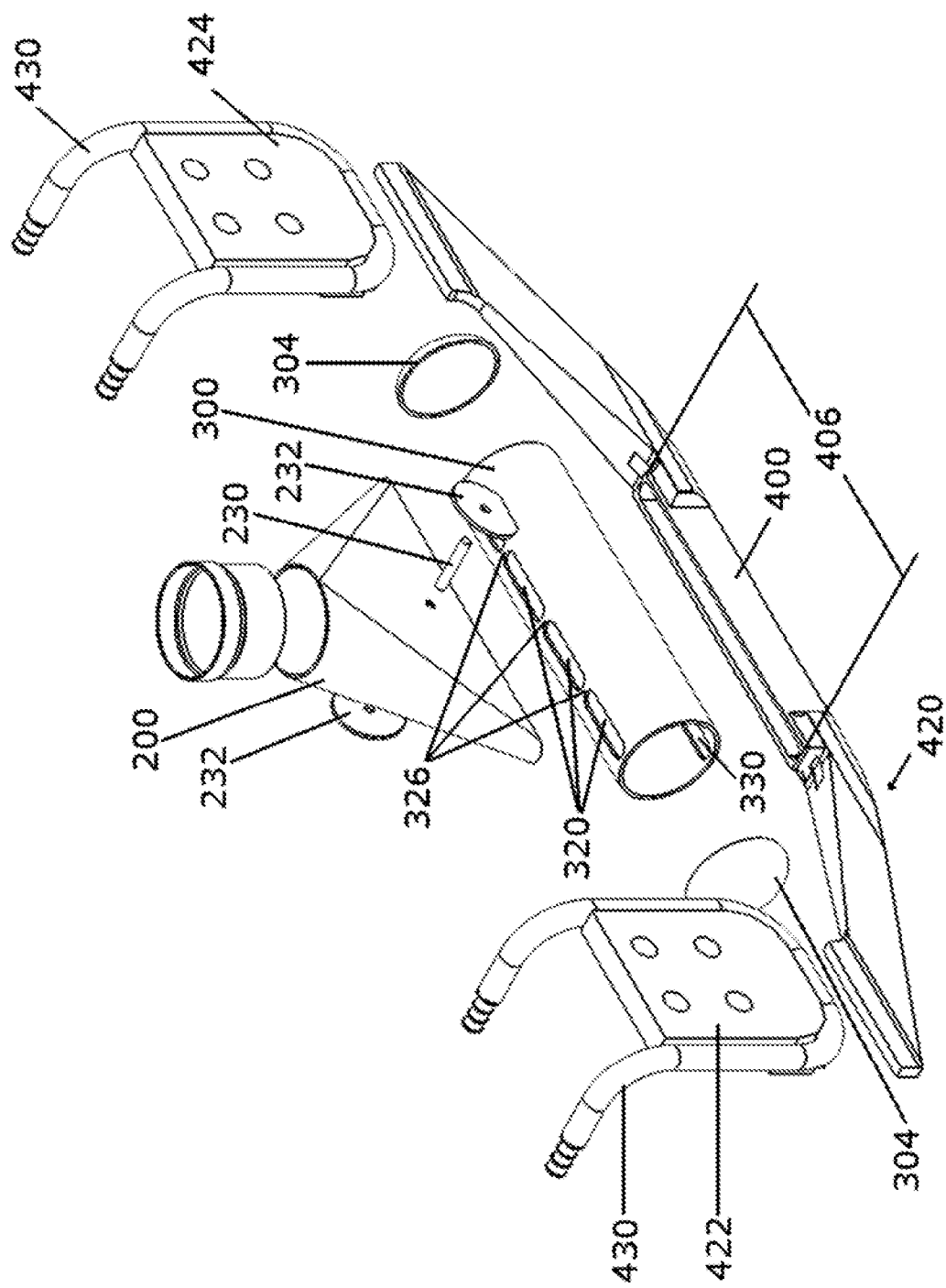
FIG. 8 is an exploded perspective view of the glass forming apparatus of FIG. 5.
Figure 9:
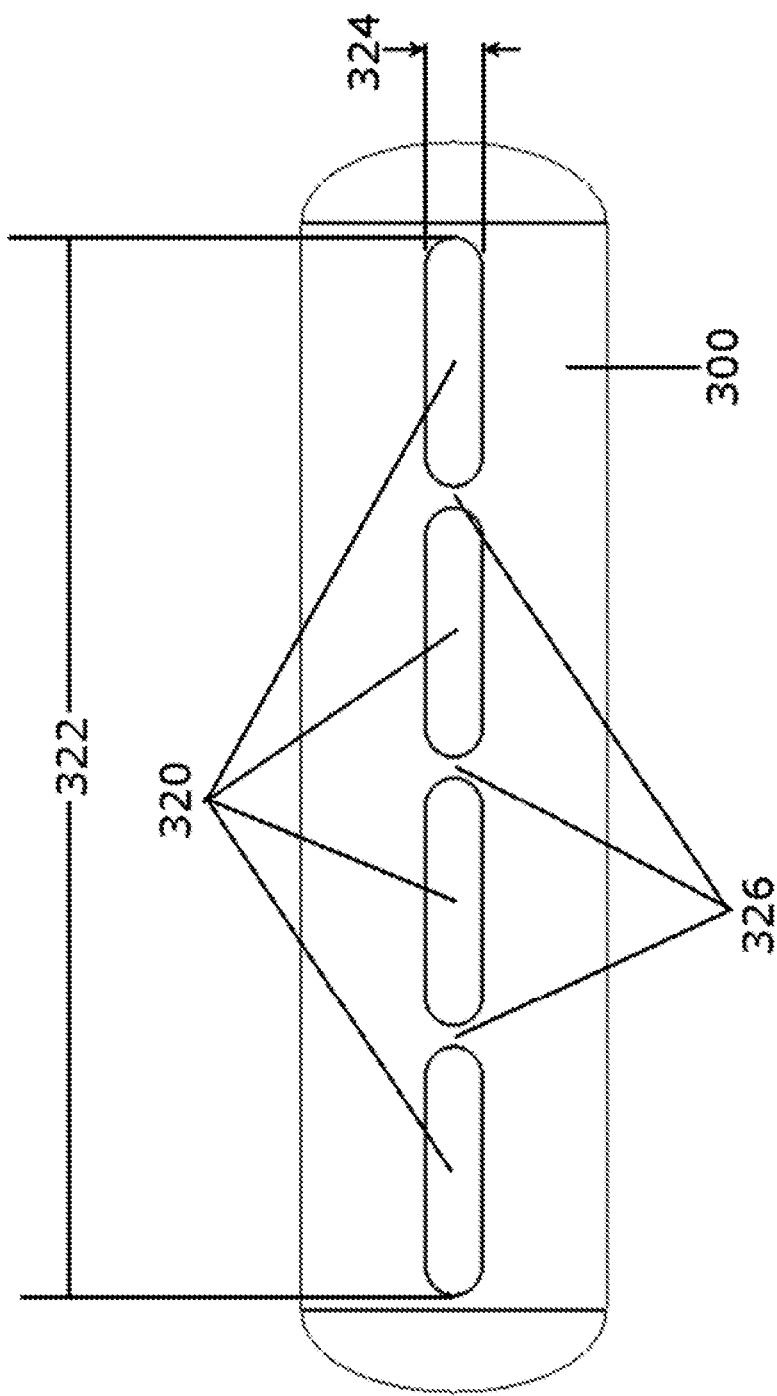
FIG. 9 is a top view of a pressure tank according to the present disclosure.

As shown in FIGS. 8-9, pressure tank 300 can include one or more upper pressure tank supports 326. Upper pressure tank supports 326 can extend along axis 30 and can extend across upper orifice 320 to prevent widening of upper orifice 320. In some embodiments, pressure tank 300 can include two upper pressure tank supports 326 that extend across orifice 320. In some embodiments, pressure tank 300 can include three upper pressure tank supports 326 that extend across upper orifice 320.

Upper pressure tank supports 326 can be permanently fixed across upper orifice 320, for example, by metallurgic bonding by welding or brazing. In some embodiments, upper orifice 320 can include a plurality of apertures formed in pressure tank wall 302. In this embodiment, portions of pressure tank wall 302 can be removed to form the plurality of apertures for upper orifice 320. Upper pressure tank supports 326 can be integrally formed in pressure tank wall 302. For example, in manufacturing pressure tank 300, pressure tank wall 302 can begin as a unitary piece of material and portions of pressure tank wall 302 can be removed to form the plurality of apertures for upper orifice 320. One or more portions of pressure tank wall 302 that remain between the respective apertures for upper orifice 320 form one or more integral upper pressure tank supports 326.

Figure 10:
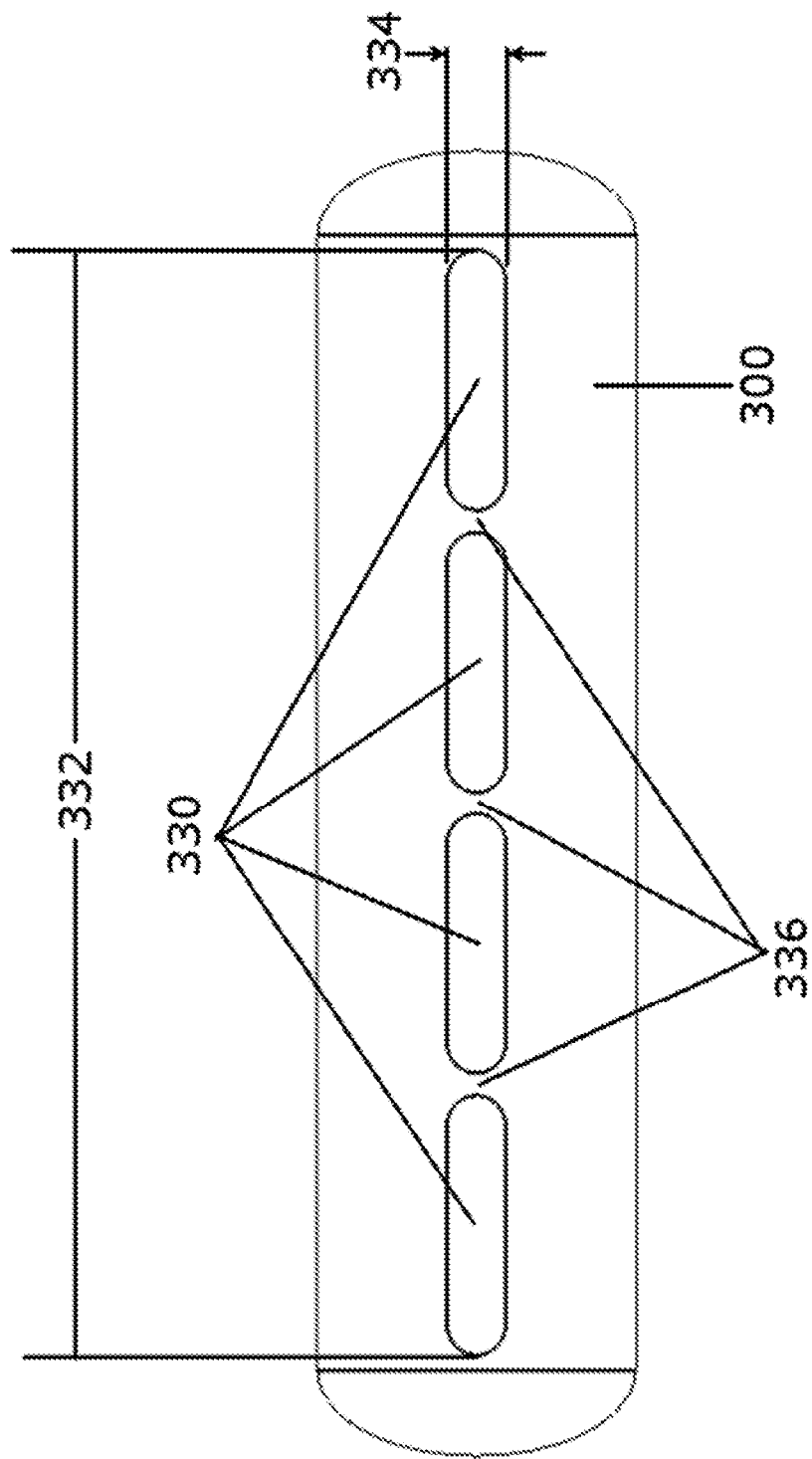
FIG. 10 is a bottom view of the pressure tank of FIG. 8.

As shown in FIG. 10, pressure tank 300 can include one or more lower pressure tank supports 336. Lower pressure tank supports 336 can extend along axis 30 and can extend across lower orifice 330 to prevent widening of lower orifice 330. In some embodiments, pressure tank 300 can include two lower pressure tank supports 336 that extend across orifice 330. In another embodiment, pressure tank 300 can include three lower pressure tank supports 336 that extend across lower orifice 330.

Lower pressure tank supports 336 can be permanently fixed across lower orifice 330, for example, by metallurgic bonding by welding or brazing. In some embodiments, lower orifice 330 can include a plurality of apertures formed in pressure tank wall 302. In this embodiment, portions of pressure tank wall 302 can be removed to form the plurality of apertures for lower orifice 330. Lower pressure tank supports 336 can be integrally formed in pressure tank wall 302. For example, in manufacturing pressure tank 300, pressure tank wall 302 can begin as a unitary piece of material and portions of pressure tank wall 302 can be removed to form the plurality of apertures for lower orifice 330. One or more portions of pressure tank wall 302 that remain between the respective apertures for lower orifice 330 form one or more integral lower pressure tank supports 336.

In some embodiments, pressure tank 300 could include one or more tank supports positioned along a height of pressure tank 300. In this embodiment, the one or more tank supports could extend across pressure tank chamber 301.

The internal reinforcements in glass former 140 prevent material deformation and creep. For example, because lower pressure tank supports 336 prevent material deformation and creep at lower orifice 330, the opening distance 334 of lower orifice 330 can be constant along lower orifice width 332.

Upper pressure tank supports 326 and lower pressure tank supports 336 can create separate streams of molten glass flowing through pressure tank 300 and lower orifice 330. For example, upper pressure tank supports 326 and lower pressure tank supports 336 can separate the molten glass flowing through pressure tank 300 and lower orifice 330 into two or more streams of molten glass.

Figure 7:
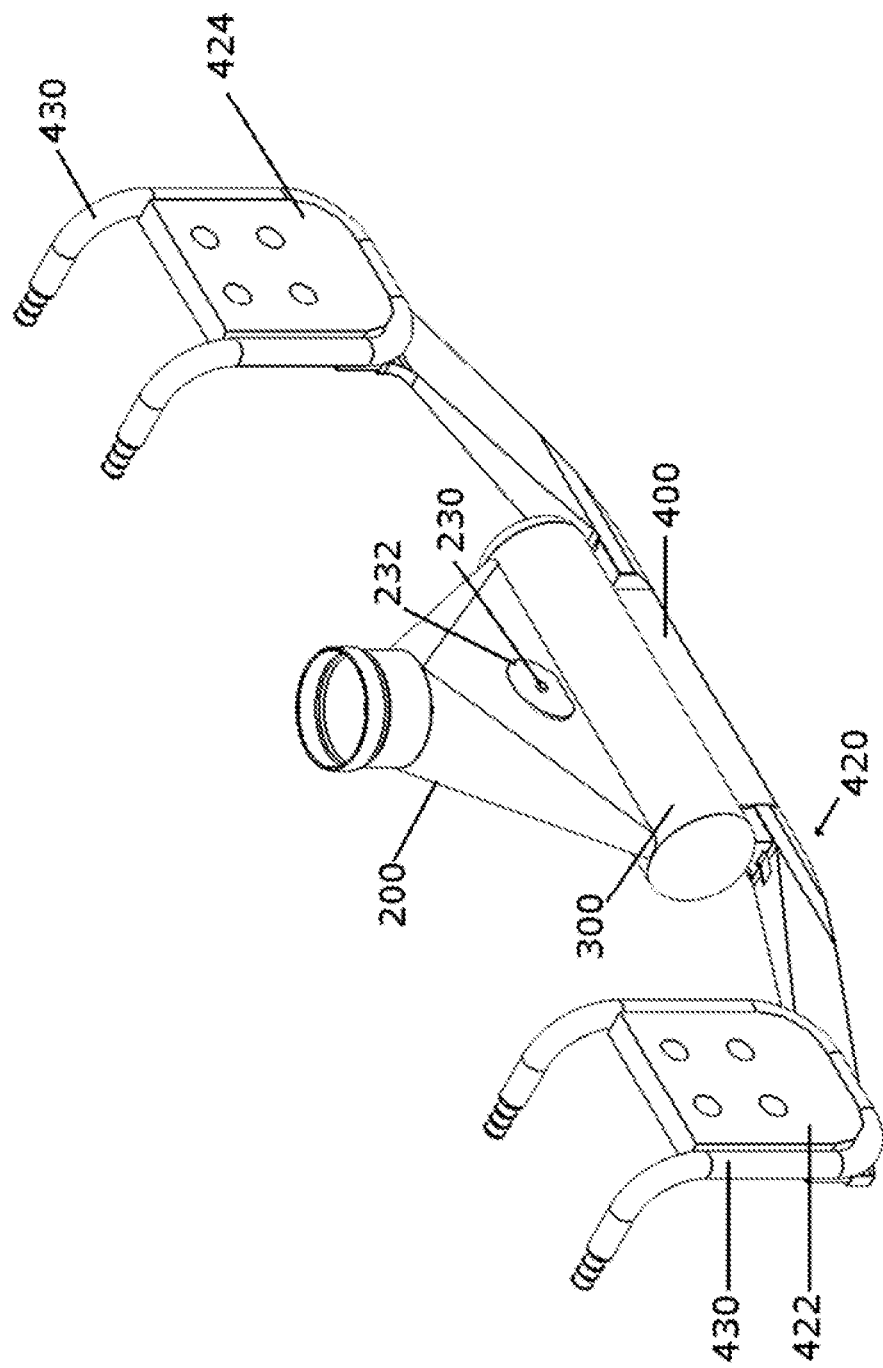
FIG. 7 is a perspective view of another glass forming apparatus according to the present disclosure.

In some embodiments, glass former 140 can include a slot extension 400 attached to pressure tank 300, as shown in FIGS. 7-8. An interior area 401 of slot extension 400 can be in fluid communication with pressure tank chamber 301. The separate streams of molten glass resulting from upper pressure tank supports 326 and lower pressure tank supports 336 can converge in slot extension 400 and fuse into glass ribbon 103.

Figure 11:
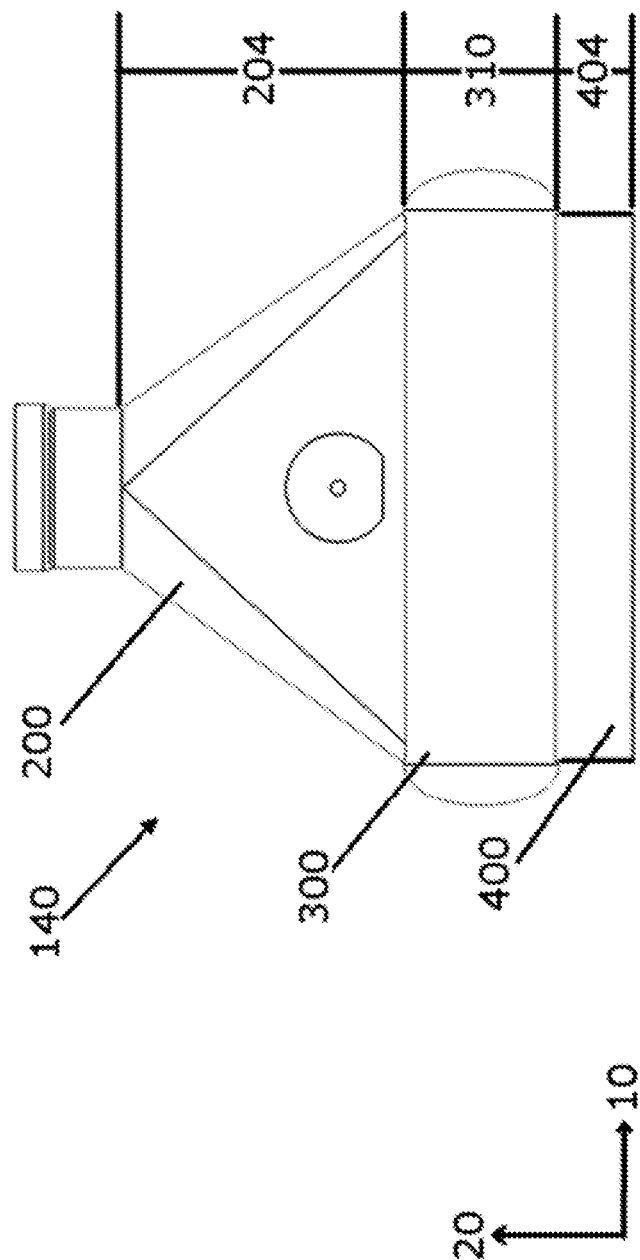
FIG. 11 is a front view of another glass forming apparatus according to the present disclosure.
Figure 12:
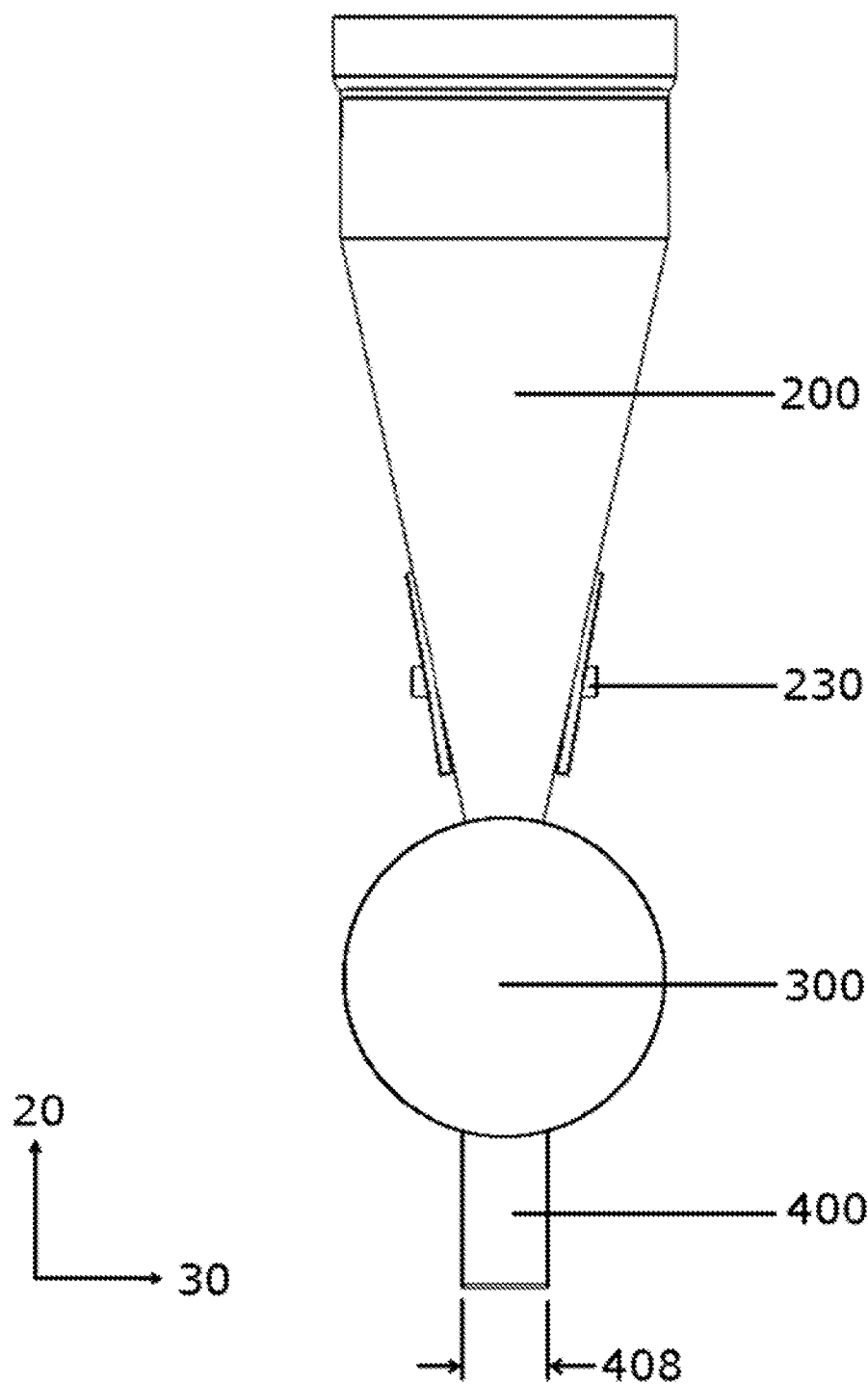
FIG. 12 is a side view of the glass forming apparatus of FIG. 11.
Figure 13:
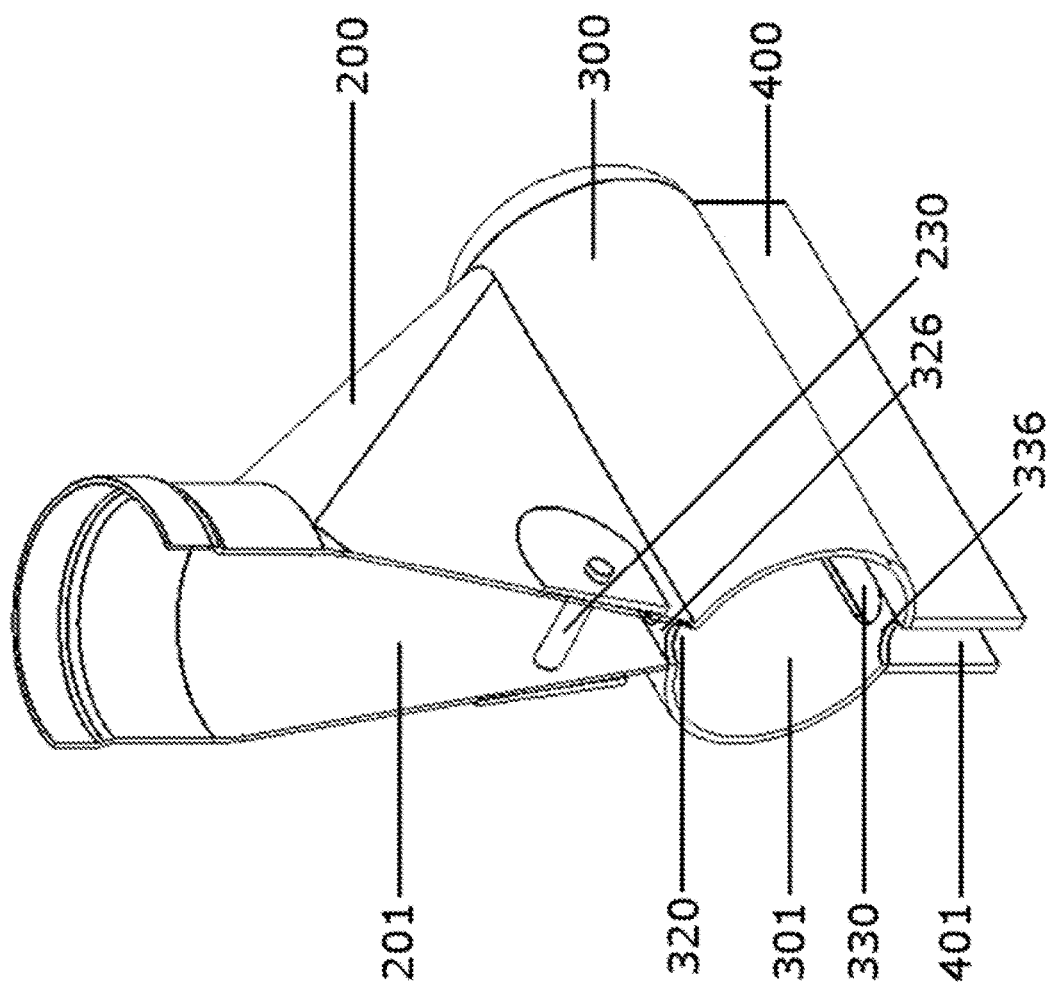
FIG. 13 is a section view of the glass forming apparatus shown in FIG. 11.

Slot extension 400 can include a slot extension height 404, a slot extension width 406, and a slot extension opening distance 408, as shown in FIGS. 11-12. In some embodiments, slot extension width 406 can be slightly larger than lower orifice width 332 so that slot extension 400 completely surrounds lower orifice 330. In some embodiments, slot extension width 406 can be from approximately 50 mm to approximately 1.5 m. In a further embodiment, slot extension width 406 can be from approximately 50 mm to approximately 500 mm. In another embodiment, slot extension width 406 can be from approximately 150 mm to approximately 300 mm.

In some embodiments, slot extension height 404 can be from approximately 10 mm to approximately 30 mm. In another embodiment, slot extension height 404 can be from approximately 15 mm to approximately 25 mm. In a further embodiment, slot extension height 404 can be from approximately 18 mm to approximately 22 mm. In another embodiment, slot extension height 404 can be approximately 20 mm.

Slot extension opening distance 408 can be slightly larger than lower orifice opening distance 334 so that slot extension 400 completely surrounds lower orifice 330. In some embodiments, pressure tank opening dimension 308 can be approximately two to approximately ten times greater than slot extension opening distance 408. Pressure tank opening dimension 308 can be approximately four to approximately six times greater than slot extension opening distance 408.

As shown in FIGS. 7-8, glass former 140 can also include a heat source 420 to prevent the molten glass flow from cooling. In some embodiments, heat source 420 can be slot extension 400. A first end 422 of heat source 420 can be configured to be attached to a first electric connection and a second end 424 of heat source 420 can be configured to be attached to a second electrical connection to supply a current through heat source 420 and slot extension 400 to generate heat via direct heating. For direct heating, the first electric connection at first end 422 and the second electrical connection at second end 424 can provide direct electrical input into slot extension 400 whereby the material is kept at a substantially constant temperature depending upon the desired viscosity. In another embodiment, heat source 420 can provide heat via induction heating (not shown). In another embodiment, heat source 420 can include a winding or a ceramic heating element (not shown) attached to an exterior surface of slot extension 400. Glass former 140 can also include cooling tubes 430 positioned adjacent to heat source 420. Cooling fluid can be passed through cooling tubes 430 to maintain glass former 140 at a desired temperature. In some embodiments, glass former 140 can include temperature sensors (not shown) to determine the temperature at one or more positions in glass former 140. The temperature sensors can be utilized to determine an appropriate heat setting for heat source 420 and an appropriate cool setting for cooling tubes 430 to achieve a desired viscosity of molten glass flowing therein.

Figure 14:
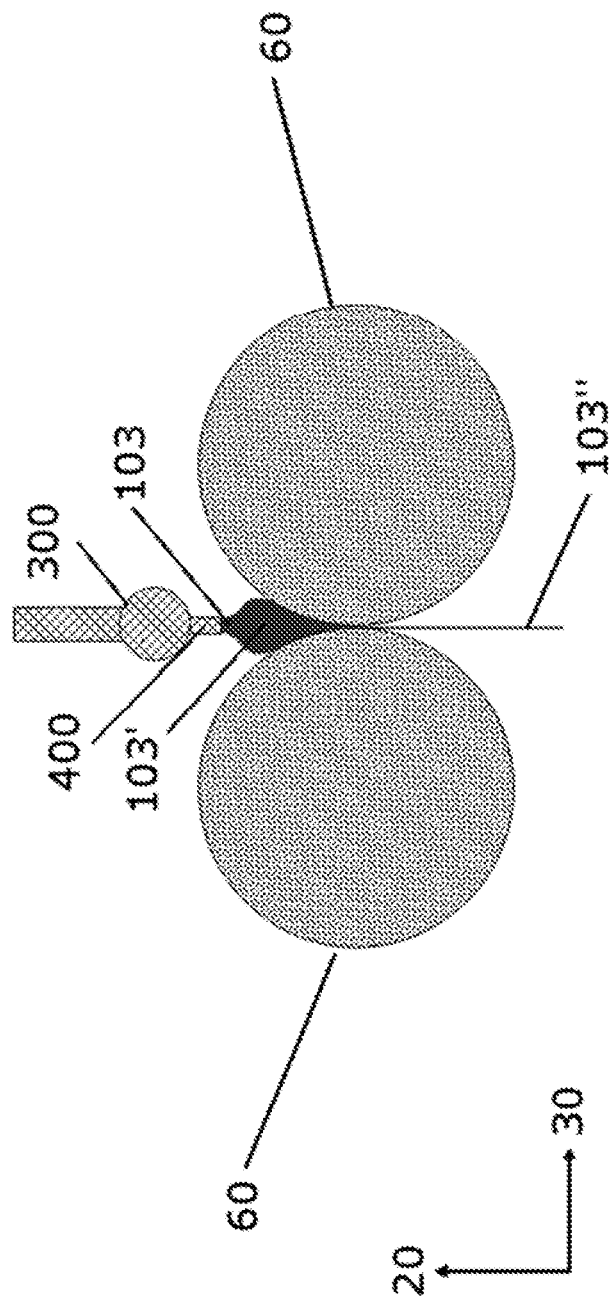
FIG. 14 is a side view of the glass forming apparatus of FIG. 11 including forming rolls.

In some embodiments, glass former 140 can deliver glass ribbon 103 for further processing. In other embodiments, glass former 140 can be utilized with a vertical rolling process and can supply glass ribbon 103 to a pair of forming rolls 60 for further processing of glass ribbon 103, as shown in FIG. 14. The pair of forming rolls 60 can be conventional hot forming rolls that are temperature controlled at a surface temperature in a range from about 500 degrees Celsius to about 600 degrees Celsius, or higher, depending on the composition and viscosity of the glass being formed. Processes and devices for the temperature control of forming rolls are well understood in the art and are therefore not described in detail herein Slot extension 400 can also deliver glass ribbon 103 as low as possible between the pair of forming rolls 60 to prevent instability in the flow of glass ribbon 103. For example, the diameter of rolls 60 can be large enough that rolls 60 extend beyond a plane formed by the bottom of slot extension 400 so a stable flow of glass ribbon 103 can be provided to rolls 60. As shown in FIG. 14, glass ribbon 103 can exit slot extension 400 and accumulate on a top portion of rolls 60 to form a glass ribbon puddle 103'. The pair of forming rolls 60 can flatten, thin, and smooth the glass ribbon puddle 103' into pressed glass ribbon 103". The thickness of glass ribbon 103 can be greater than the thickness of pressed glass ribbon 103". The thickness of glass ribbon puddle 103' can be greater than the thickness of glass ribbon 103.

Due to the high temperature conditions under which a glass former operates, the material of the glass former may be subject to creep, which deforms the glass former. Creep may be more pronounced where the glass former is also subject to stress. Creep results in deformation of the glass former, which can result in degraded performance. For example, a change in the shape of an orifice from which glass flows can alter the velocity of glass flow at different points across the width of the glass former. One way to reduce creep is to surround the glass former with a refractory material. But, the refractory material can add bulk to the glass former. This additional bulk may interfere with the ability to deliver a glass ribbon close to forming rolls.

Embodiments of glass formers described herein are resistant to creep in the absence of a refractory material. For example, the use of a 80/20 PtRh alloy, a 90/10 PtRh alloy and similar materials, the presence of upper transition member support 230, upper pressure tank support 326, lower pressure tank support 336, and a cylindrical shape for pressure tank 300 each contribute to creep resistance. These features, alone or in combination, contribute to a design that is resistant to creep even without the use of refractory materials. A combination of all of these features is particularly preferred for creep resistance In a glass former, the velocity of molten glass flow tends to be higher in the middle of the width of the glass former because the middle is furthest from the walls of the glass former. Without a pressure tank, a uniform velocity (deviation of plus or minus about 5%) can be achieved by varying the shape of an orifice so the orifice opening distance is smallest at the middle of the width and largest at the respective ends of the width, i.e., a dog bone or bowtie shape. This irregular shape can be difficult to manufacture and can be subject to creep and expansion of the orifice opening distance over time.

A pressure tank may result in uniform velocity across the width of the lower orifice where the orifice opening distance is uniform across the width of the orifice. This simpler geometry is easier to manufacture.

Figure 15:
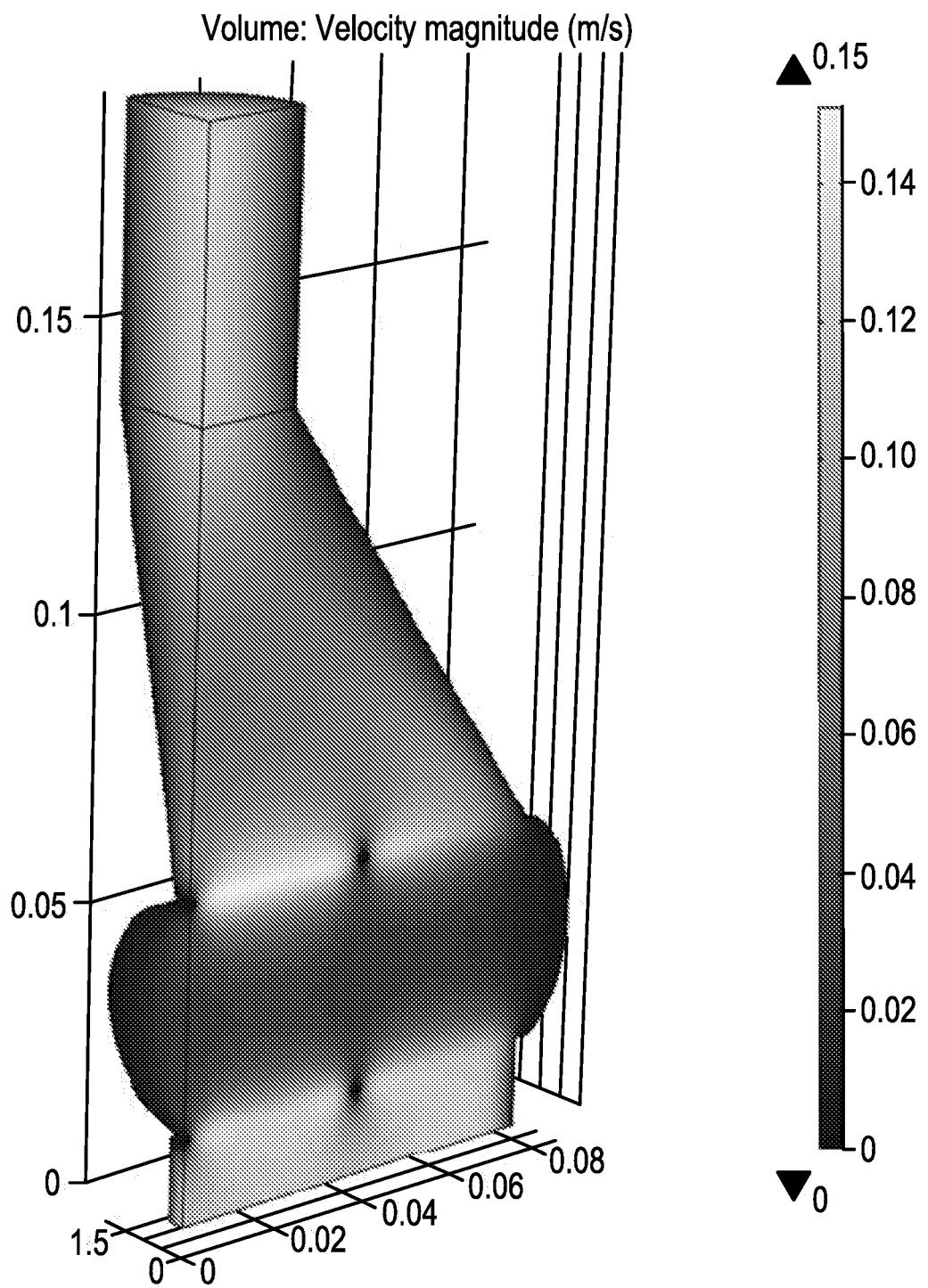
FIG. 15 is a perspective view of the glass forming apparatus of FIG. 11 showing a prediction of fluid flow through the glass forming apparatus.
Figure 16:
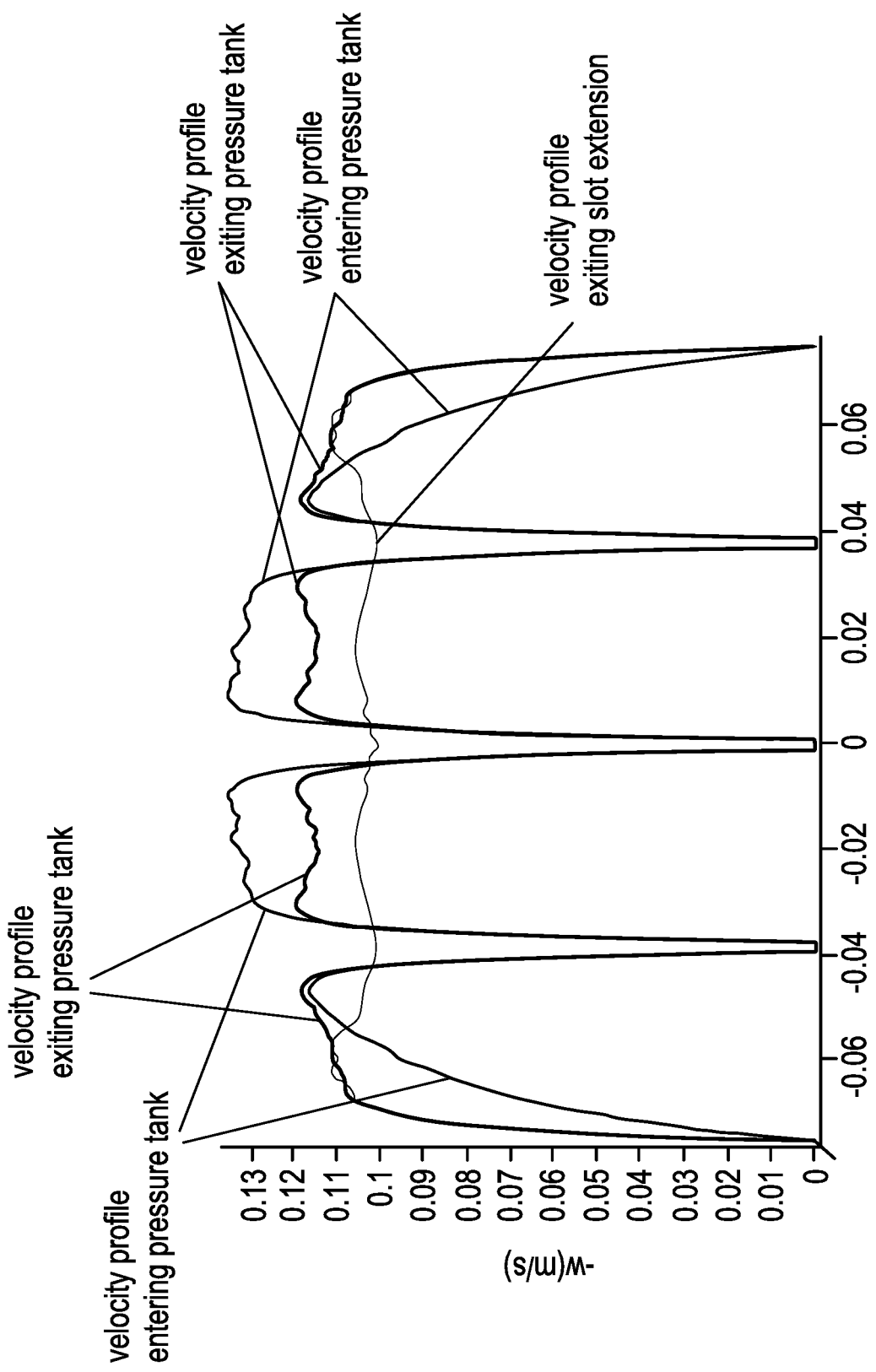
FIG. 16 is a graph showing the velocity profiles of molten glass through the glass forming apparatus of FIG. 11.

FIG. 15 shows a 3D fluid flow model velocity magnitude prediction of molten glass through glass former 140. Because the flow is symmetric in glass former 140 across a first mid-plane and a second mid-plane perpendicular to the first mid-plane, the domain of the computer model is one-quarter of glass former 140. As shown, the local velocity of the molten glass flow where molten glass touches the side walls of glass former 140 is about zero. Molten glass entering upper transition member 200 has a faster velocity at its center. The local velocity of the molten glass flow is also about zero in the region of upper pressure tank support 326 and lower pressure tank support 336. While the velocity of molten glass through upper orifice 320 and lower orifice 330 is relatively fast, the velocity of molten glass is slower in pressure tank 300 because the molten glass is distributed within pressure tank chamber 301 before flowing through lower orifice 330. Thus, any separate streams of molten glass caused by molten glass flow past upper pressure tank support 326 and/or lower pressure tank support 336 converge and fuse within slot extension 400 into glass ribbon 103. As shown in FIG. 15, glass former 140 can draw glass ribbon 103 having a uniform velocity at the end of slot extension 400. As shown in FIG. 16, the velocity profile of the molten glass flow across the width of the lower end of slot extension 400 has a deviation of plus or minus about 5%.

Figure 17:
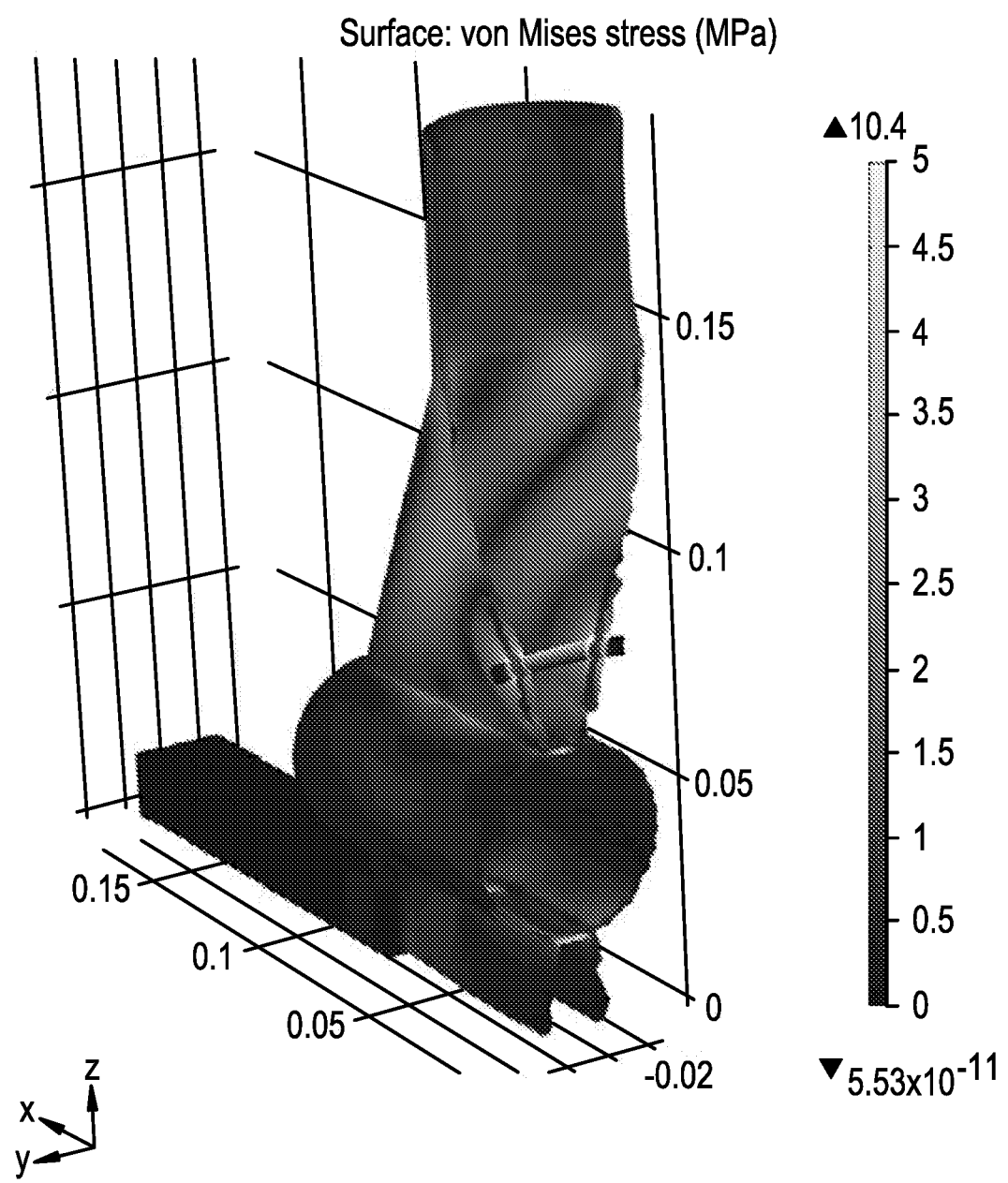
FIG. 17 is a section view of the glass forming apparatus of FIG. 11 showing a prediction of surface von Mises stress (MPa) in the glass forming apparatus.

FIG. 17 shows a sectional view of glass former 140 to demonstrate the surface von Mises stress (MPa), as predicted with a 3D comsol model. As shown, despite the high tensile stress in each inner structural reinforcement, upper transition member support 230, upper pressure tank support 326, and lower pressure tank support 336 reduce material creep within glass former 140.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of such teachings and guidance.

The breadth and scope of the present disclosure should not be limited by any of the above-described exemplary embodiments, but should be defined only in accordance with the following claims and their equivalents.

What is claimed is:

1. A glass forming apparatus comprising:
   an upper transition member, the upper transition member including a transition chamber, wherein the upper transition member is tapered along a height from a lower end to an upper end, where the lower end has a lower end width and a lower end opening distance, and the upper end has an upper end width and an upper end opening distance, where the lower end width is greater than the upper end width, and the upper end opening distance is greater than the lower end opening distance, wherein the transition chamber has a transition chamber width less than the upper end width; and
   a pressure tank attached to the upper transition member, the pressure tank comprising an upper orifice and a lower orifice, such that a chamber within the pressure tank is in fluid communication with the transition chamber.

2. The glass forming apparatus of claim 1, further comprising:
   an upper pressure tank support positioned across the upper orifice;
   a lower pressure tank support positioned across the lower orifice; and
   a slot extension attached to the pressure tank such that an interior area of the slot extension is in fluid communication with the pressure tank.

3. The glass forming apparatus of claim 2, further comprising a second upper pressure tank support positioned across the upper orifice.

4. The glass forming apparatus of claim 2, further comprising a second lower pressure tank support positioned across the lower orifice.

5. The glass forming apparatus of claim 2, wherein the upper orifice comprises a first upper aperture and a second upper aperture,
   wherein the upper pressure tank support is positioned between the first upper aperture and the second upper aperture, and
   wherein the upper pressure tank support is integrally formed in a wall of the pressure tank.

6. The glass forming apparatus of claim 2, wherein the lower orifice comprises a first lower aperture and a second lower aperture,
   wherein the lower pressure tank support is positioned between the first lower aperture and the second lower aperture, and
   wherein the lower pressure tank support is integrally formed in a wall of the pressure tank.

7. The glass forming apparatus of claim 2, wherein the apparatus includes a heat source.

8. The glass forming apparatus of claim 7, wherein the heat source is the slot extension such that a first end of the slot extension is configured to receive a first electrical connection and a second end of the slot extension is configured to receive a second electrical connection.

9. The glass forming apparatus of claim 1, further comprising an upper transition member support positioned across the transition chamber.

10. The glass forming apparatus of claim 2, wherein a height of the slot extension is in a range from about 18 mm to about 22 mm.

11. The glass forming apparatus of claim 1, wherein the pressure tank comprises:
    an end dimension extending along an end plane, the end plane being parallel to a first end of the pressure tank;
    a width extending between the first end and a second end of the pressure tank; and
    are opening dimension along an opening direction, the opening direction being parallel to the end plane and perpendicular to the width,
    wherein an interior opening dimension of the pressure tank is greater than an opening distance of the lower orifice.

12. The glass forming apparatus of claim 11, wherein the interior opening dimension distance is in a range from about two to about ten times greater than the opening distance of the lower orifice.

13. The glass forming apparatus of claim 1, wherein the pressure tank comprises a cylindrical shape,
    wherein a longitudinal axis of the pressure tank extends along a width of a lower end of the upper transition member,
    wherein the lower orifice has a width and an opening distance, and
    wherein a diameter of the pressure tank is greater than the opening distance of the lower orifice.

14. The glass forming apparatus of claim 13, wherein the chamber within the pressure tank is in fluid communication with the transition chamber through the upper orifice.

15. The glass forming apparatus of claim 14, wherein the transition member comprises a trapezoidal shape.

16. The glass forming apparatus of claim 1, wherein the lower orifice comprises a width in a range from about 50 mm to about 1.5 m.

17. The glass forming apparatus of claim 16, wherein the lower orifice comprises a width in a range from about 150 mm to about 300 mm.

* * * * *